(12) United States Patent
Sato et al.

(10) Patent No.: US 10,353,233 B2
(45) Date of Patent: Jul. 16, 2019

(54) LIQUID CRYSTAL DISPLAY

(71) Applicant: Panasonic Liquid Crystal Display Co., Ltd., Himeji-shi, Hyogo (JP)

(72) Inventors: Naoki Sato, Hyogo (JP); Kazuhiko Tsuda, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 126 days.

(21) Appl. No.: 15/465,255

(22) Filed: Mar. 21, 2017

(65) Prior Publication Data

US 2018/0275450 A1 Sep. 27, 2018

(51) Int. Cl.
*G02F 1/1335* (2006.01)

(52) U.S. Cl.
CPC .. *G02F 1/133509* (2013.01); *G02F 1/133603* (2013.01); *G02F 1/133605* (2013.01); *G02F 1/133606* (2013.01); *G02F 2001/133607* (2013.01)

(58) Field of Classification Search
CPC .............. G02F 1/133606; G02F 1/133603
See application file for complete search history.

(56) References Cited

U.S. PATENT DOCUMENTS

| 8,237,883 | B2 | 8/2012 | Baba et al. | |
| 2003/0062520 | A1* | 4/2003 | Toguchi | H01L 27/322 257/40 |
| 2006/0221592 | A1* | 10/2006 | Nada | H01L 33/22 362/23.18 |
| 2009/0180052 | A1* | 7/2009 | Hsu | G02B 6/005 349/62 |
| 2010/0245708 | A1 | 9/2010 | Baba et al. | |
| 2012/0327311 | A1* | 12/2012 | Kuromizu | G02F 1/133603 348/739 |
| 2015/0153023 | A1* | 6/2015 | Jepsen | F21V 13/02 362/602 |
| 2018/0299730 | A1* | 10/2018 | Saito | G02F 1/133605 |

* cited by examiner

*Primary Examiner* — Alexander P Gross
(74) *Attorney, Agent, or Firm* — Hamre, Schumann, Mueller & Larson, P.C.

(57) ABSTRACT

A liquid crystal display device according to an embodiment is disclosed. The liquid crystal display device includes a liquid crystal display panel; a light emitting diode (LED) substrate; a plurality of light emitting diodes (LEDs) disposed on the LED substrate; a first diffuser disposed between the plurality of LEDs and the liquid crystal display panel; a bandpass filter being disposed between the plurality of LEDs and the diffuser; and a plurality of focus lenses corresponding to the plurality of LEDs, wherein each of the LEDs includes one of the plurality of focus lenses.

9 Claims, 5 Drawing Sheets

LIQUID CRYSTAL DISPLAY

FIELD

This disclosure relates generally to a display device. More specifically, the disclosure relates to a display device such as, but not limited to, a liquid crystal display device.

BACKGROUND

A liquid crystal display (LCD) device is an electronic display device that is widely used as a display device for electronic devices such as computers, televisions, cellular phones, and the like. LCD devices generally include a thin film transistor (TFT) substrate and a color filter substrate. A liquid crystal layer is disposed between the TFT substrate and the color filter substrate.

SUMMARY

This disclosure relates generally to a display device. More specifically, the disclosure relates to a display device such as, but not limited to, a liquid crystal display (LCD) device.

In an embodiment, the LCD device includes an in-plane switching (IPS) mode LCD device.

In an embodiment, the display device is included as a display device for an electronic device such as, but not limited to, a display for a laptop computer, a display for a tablet computer, a display for a desktop computer, or the like.

In an embodiment, the LCD device includes a plurality of light emitting diodes (LEDs) disposed on an LED substrate. A bandpass filter is disposed on an output side of the LEDs such that the LEDs are disposed between the LED substrate and the bandpass filter. The bandpass filter is provided to widen a color reproduction range of the LCD device. In an embodiment, the bandpass filter sharpens the light spectrum, thereby increasing color purity and widening the color reproduction range. That is, in an embodiment, the light spectrum of the LCD device having the bandpass filter is relatively narrower than an LCD device without the bandpass filter.

In an embodiment, the LCD device having the bandpass filter can implement a wider range of colors than a range of colors specified in common video standards such as, but not limited to, standards set by the National Television System Committee (NTSC).

A liquid crystal display device according to an embodiment is disclosed. The liquid crystal display device includes a liquid crystal display panel; a light emitting diode (LED) substrate; a plurality of light emitting diodes (LEDs) disposed on the LED substrate; a first diffuser disposed between the plurality of LEDs and the liquid crystal display panel; a bandpass filter being disposed between the plurality of LEDs and the diffuser; and a plurality of focus lenses corresponding to the plurality of LEDs, wherein each of the LEDs includes one of the plurality of focus lenses.

A liquid crystal display device according to an embodiment is disclosed. The liquid crystal display device includes a liquid crystal display panel; a light emitting diode (LED) substrate; a plurality of light emitting diodes (LEDs) disposed on the LED substrate; a diffuser disposed between the plurality of LEDs and the liquid crystal display panel; and a bandpass filter being disposed between the plurality of LEDs and the diffuser, wherein the bandpass filter includes a plurality of semispherical bandpass filter portions, each of the plurality of bandpass filter portions being disposed on the LCD substrate and surrounding one of the plurality of LEDs.

A liquid crystal display device according to an embodiment is disclosed. The liquid crystal display device includes a liquid crystal display panel including a thin film transistor (TFT) substrate and a color filter substrate, with a liquid crystal layer disposed therebetween; a backlight including a light emitting diode (LED) substrate having a plurality of light emitting diodes (LEDs) disposed thereon; a plurality of focus lenses corresponding to the plurality of LEDs, each of the plurality of LEDs disposed in corresponding one of the plurality of focus lenses; and a bandpass filter that sharpens a spectrum of light emitted from one of the plurality of the LEDs through one of the plurality of focus lenses, the bandpass filter being disposed between the plurality of LEDs and the liquid crystal display panel.

A method according to an embodiment is disclosed. The method includes emitting light from a backlight of a liquid crystal display device, the light being emitted from a plurality of light emitting diodes (LEDs); passing the light through a bandpass filter; and passing the light through a liquid crystal display panel.

BRIEF DESCRIPTION OF THE DRAWINGS

References are made to the accompanying drawings that form a part of this disclosure, and that illustrate embodiments in which the systems and methods described in this specification can be practiced.

Like reference numbers represent like parts throughout.

DETAILED DESCRIPTION

Liquid crystal display (LCD) devices can be applied extensively in a display for a device such as a large-screen television, a display for a laptop computer, a display for a tablet computer, a display for a desktop computer, or the like. A light emitting diode (LED) used for backlight in such LCD devices that produces white light is configured by combining blue LEDs, which emit blue light, and phosphor, which emits yellow light when excited by blue light from the LEDs, or by a combination of blue LEDs, green LEDs, and red LEDs. In recent years, a region of color-space on a chromaticity diagram required by new display standards (e.g., BT.2020 display standards) is wider than that for conventional standards (e.g., NTSC standards). However, color purity of light emitted from LCDs may be low. Thus, the color reproduction range may be narrow in an LCD device. Low color purity is a result of the light emitted having poor monochromaticity because the light emitted contains a plurality of wavelengths. Thus a backlight unit for an LCD device that can implement a wider range of colors than that specified by the NTSC standard is desirable.

Figure 1:
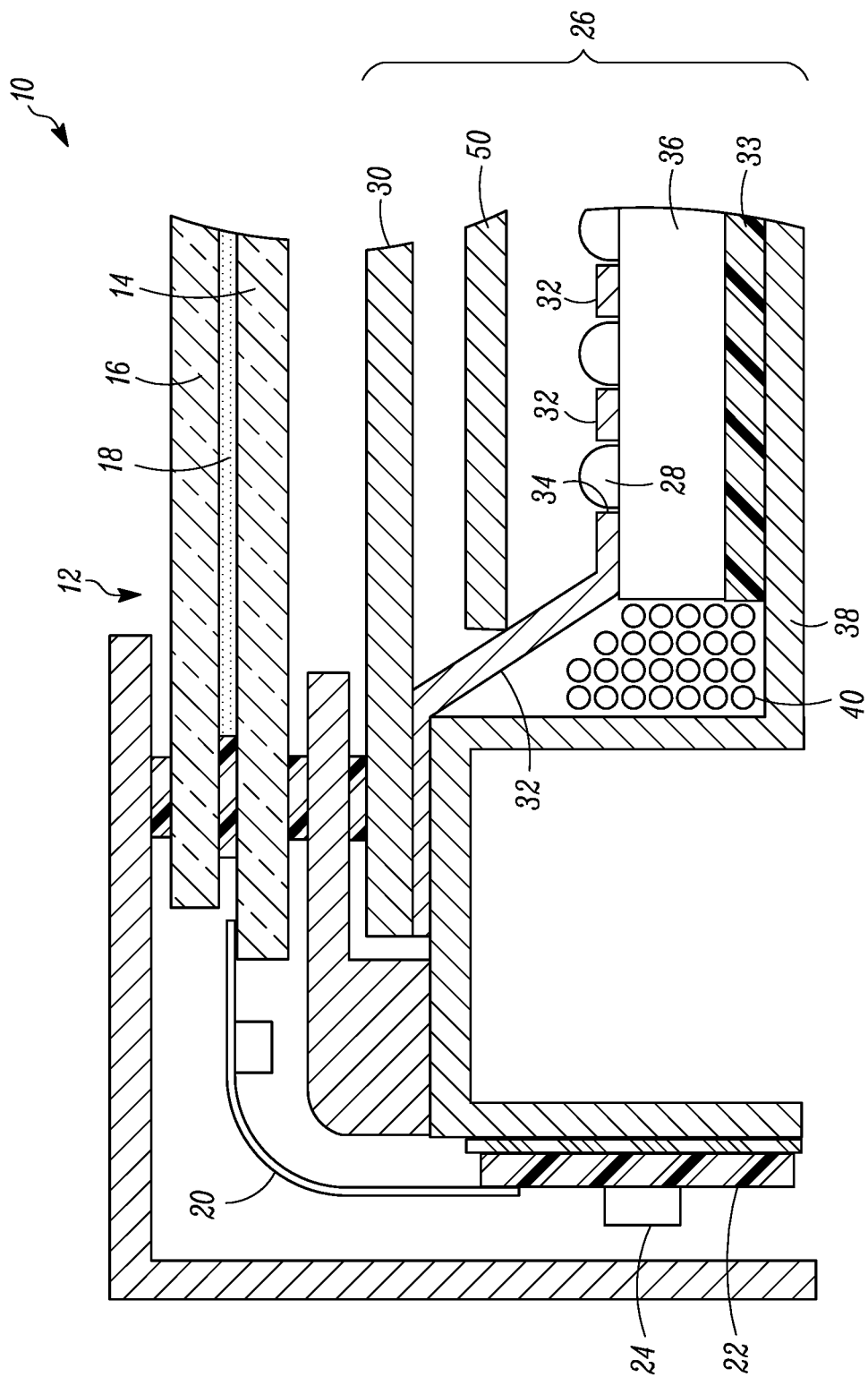
FIG. 1 illustrates a sectional view of a portion of a liquid crystal display (LCD) device, according to an embodiment.

FIG. 1 illustrates a sectional view of a portion of a liquid crystal display (LCD) device 10, according to an embodiment. Unless indicated specifically, the various hatching in the figure is intended to enhance the readability of the figure and is not intended to limit the features to specific materials. The LCD device includes an LCD panel 12. The LCD panel 12 includes a thin film transistor (TFT) substrate 14 and a color filter substrate 16. A liquid crystal (liquid crystal layer 18) is held between the TFT substrate 14 and the color filter substrate 16. The LCD panel 12 can be driven by any mode. Examples of suitable driving modes include, but are not limited to, an in-plane switching (IPS) mode, a twisted nematic (TN) mode, or vertical alignment (VA) mode.

A connector 20 electrically connects the LCD panel 12 to a printed circuit board (PCB) 22. An integrated circuit chip 24 is disposed on the PCB 22. The integrated circuit chip 24 includes a driver circuit for the LCD panel 12. In an embodiment, the connector 20 can be flexible. In an embodiment, the connector 20 can include a plurality of connectors 20. The connector 20 can alternatively be referred to as the flexible connector 20, the flexible printed circuit (FPC) 20, or the like. In an embodiment, the connector 20 can include a single connector 20.

The LCD device 10 includes a backlight 26. In the illustrated embodiment, the backlight 26 includes a plurality of light emitting diodes (LEDs) 28, a plurality of LED substrates 36, a diffuser 30, a bandpass filter 50, a reflective sheet 32, a heat dissipating sheet 33, and a frame 38. The LEDs 28 function as light sources for the backlight 26. A diffuser 30 is disposed between the LCD panel 12 and the LEDs 28. In an embodiment, a space is maintained between the diffuser 30 and the LEDs 28. In operation, light emitted from the LEDs 28 can be diffused by the diffuser 30 to reduce unevenness in brightness. A plurality of holes 34 are formed in the reflective sheet 32 so that the LEDs 28 can be inserted therethrough. In operation, light emitted from the LEDs 28 can be reflected by the reflective sheet 32. In an embodiment, the reflective sheet 32 may not be included. The LEDs 28 can be secured to or mounted on the LED substrate 36. In an embodiment, each of a plurality of LED substrates 36 has one or more of the plurality of LEDs 28 secured to or mounted thereon. The frame 38 accommodates the LED substrate 36 and the heat dissipating sheet 33. The LED substrate 36 can be secured to the frame 38. A plurality of cables 40 can electrically connect the LEDs 28 to the PCB 22.

A bandpass filter 50 is disposed between the LEDs 28 and the diffuser 30. The bandpass filter 50 can alternatively be referred to as the interference filter 50, the filter 50, or the like. The bandpass filter 50 is a filter that includes a plurality of dielectric layers disposed on a glass substrate. As the bandpass filter 50 can filter a specific range of wavelengths of light and reflect other ranges of wavelengths of light, the bandpass filter 50 can sharpen a light spectrum of light passing through the bandpass filter 50. The specific range of wavelengths of light which can pass through the bandpass filter 50 may depend on an angle of incident light directed at the bandpass filter 50. Therefore the LEDs 28 and the bandpass filter 50 can be arranged so that a major planar surface of the bandpass filter 50 is disposed perpendicularly to a direction of light input to the bandpass filter 50.

The bandpass filter 50 can include, for example, a transparent substrate, usually a glass substrate, and a multilayer lamination formed thereon. The multilayer lamination can be a combination of a relatively high refractive index material such as, but not limited to, $TiO_2$, $ZrO_2$, ZnS, or the like, and a relatively low refractive index material such as, but not limited to, $SiO_2$, $MgF_2$, $Na_3AlF_6$, $CaF_2$, or the like.

Embodiments incorporating the bandpass filter 50 in the LCD device 10 are shown and described in further detail in accordance with FIGS. 2-7 below.

Figure 2:
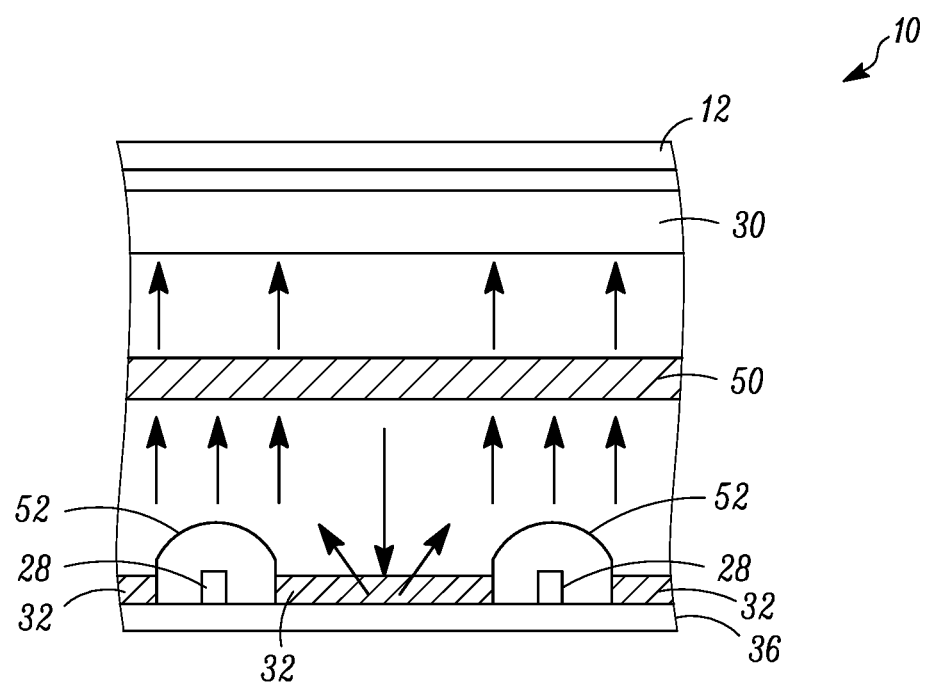
FIG. 2 is a schematic side sectional view of a portion of an LCD device, according to an embodiment.

FIG. 2 is a schematic side sectional view of a portion of the LCD device 10, according to an embodiment. Unless indicated specifically, the various hatching in the figure is intended to enhance the readability of the figure and is not intended to limit the features to specific materials. Aspects shown and described in accordance with FIG. 1 above are removed for simplicity of the figure and corresponding description. The illustrated embodiment shows two LEDs 28. It is to be appreciated that this is an example, and that the LCD device 10 will have more than two LEDs.

In the illustrated embodiment, the bandpass filter 50 is disposed between the LED substrate 36 and the diffuser 30. The reflective sheet 32 is arranged on the LED substrate 36. A focus lens 52 is disposed around each of the LEDs 28. In an embodiment, the focus lens 52 can be made of glass, resin, or the like. The focus lenses 52 are generally semicircular in geometry and can be secured to the LED substrate 36. The focus lenses 52 can be used to direct light produced by the LEDs 28 such that the light is provided at an angle that is at or about 90° relative to a major surface of the bandpass filter 50. The angle can range from at or about 80° to at or about 100°.

In the illustrated embodiment, the bandpass filter 50 can be a planar sheet. The bandpass filter 50 is disposed between the focus lenses 52 and the diffuser 30 such that a space is maintained between the bandpass filter 50 and the diffuser 30, and between the diffuser 30 and the focus lenses 52. In an embodiment, a specific range of wavelengths of light can pass through the bandpass filter 50, and other ranges of wavelengths of light may reflect on the bandpass filter 50. The other range of wavelengths of light can reflect off of the reflective sheet 32. In this case, the incident angle of the reflected light may be provided at an angle at or about 90° relative to a major surface of the bandpass filter 50. The reflected light can pass through the bandpass filter 50 even though the wavelength of the reflected light is beyond the specific range of wavelengths. This may cause the spectrum of the passing light to be relatively wider.

Figure 3:
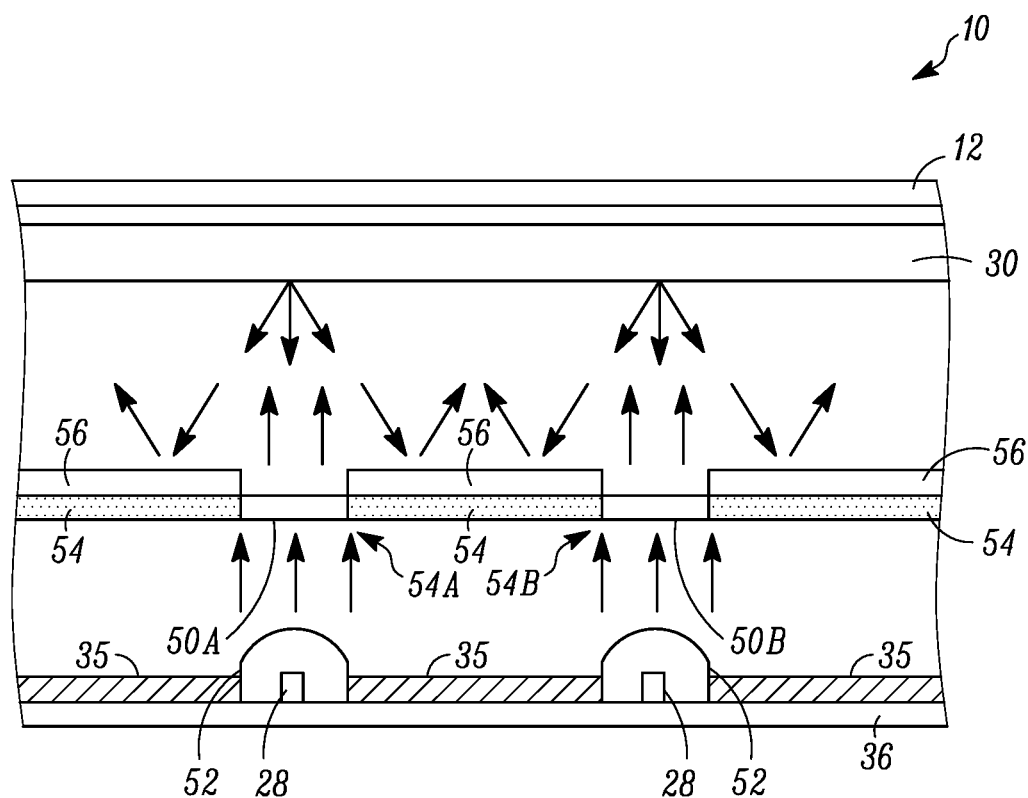
FIG. 3 is a schematic side sectional view of a portion of an LCD device, according to an embodiment.

FIG. 3 is a schematic side sectional view of a portion of the LCD device 10, according to an embodiment. Unless indicated specifically, the various hatching in the figure is intended to enhance the readability of the figure and is not intended to limit the features to specific materials. Aspects shown and described in accordance with FIG. 1 are removed for simplicity of the figure and the corresponding description. The illustrated embodiment shows two LEDs 28. It is to be appreciated that this is an example, and that the LCD device 10 will have more than two LEDs. Other aspects of FIG. 3 can be the same as or similar to aspects of FIG. 2.

In the illustrated embodiment, the bandpass filter 50 includes a plurality of bandpass filters 50A, 50B and a bandpass filter holder 54. The bandpass filter holder 54 is made of a light absorptive material. The bandpass filter holder 54 includes a plurality of holes 54A, 54B. The holes 54A, 54B can, for example, have a diameter that corresponds to a diameter of the focus lenses 52. The bandpass filters 50A, 50B are secured within the plurality of holes 54A, 54B. A reflective layer 56 is disposed between the holder and the diffuser 30. A light absorbing sheet 35 is arranged on the LED substrate 36 instead of the reflective sheet 32 in FIG. 2. The light absorbing sheet can reduce an amount of incident light that is provided to the bandpass filter 50 at an angle other than at or about 90°. The bandpass filter holder 54 can be made of a light absorptive material. As a result, an amount of light emitted by the LEDs that reflects off of the bandpass filter 50 can be reduced relative to the embodiment in FIG. 2. In an embodiment, use of bandpass filters 50A, 50B instead of the planar sheet in FIG. 2 can reduce a manufacturing cost of the LCD device 10.

Figure 4:
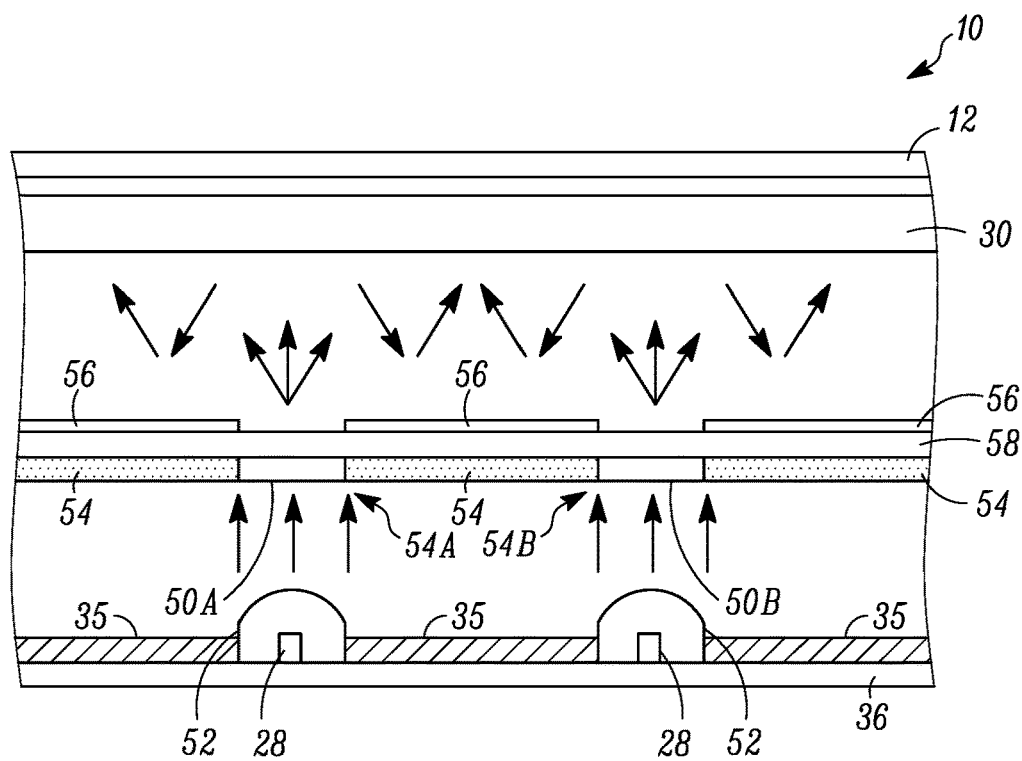
FIG. 4 is a schematic side sectional view of a portion of an LCD device, according to an embodiment.

FIG. 4 is a schematic side sectional view of a portion of the LCD device 10, according to an embodiment. Unless indicated specifically, the various hatching in the figure is intended to enhance the readability of the figure and is not intended to limit the features to specific materials. Aspects shown and described in accordance with FIG. 1 are removed for simplicity of the figure and the corresponding description. The illustrated embodiment shows two LEDs 28. It is to be appreciated that this is an example, and that the LCD device 10 will have more than two LEDs. Other aspects of FIG. 4 can be the same as or similar to aspects of FIGS. 2 and 3.

FIG. 4 includes a second diffuser 58. The second diffuser 58 is disposed between the bandpass filters 50A, 50B and the diffuser 30. The second diffuser 58 can be a planar sheet and can be sized to correspond to a size of the bandpass filter holder 54. In an embodiment, the second diffuser 58 can provide additional diffusion of the light emitted such that an intensity of the light is more even, which may ameliorate a quality of an image on a display.

Figure 5:
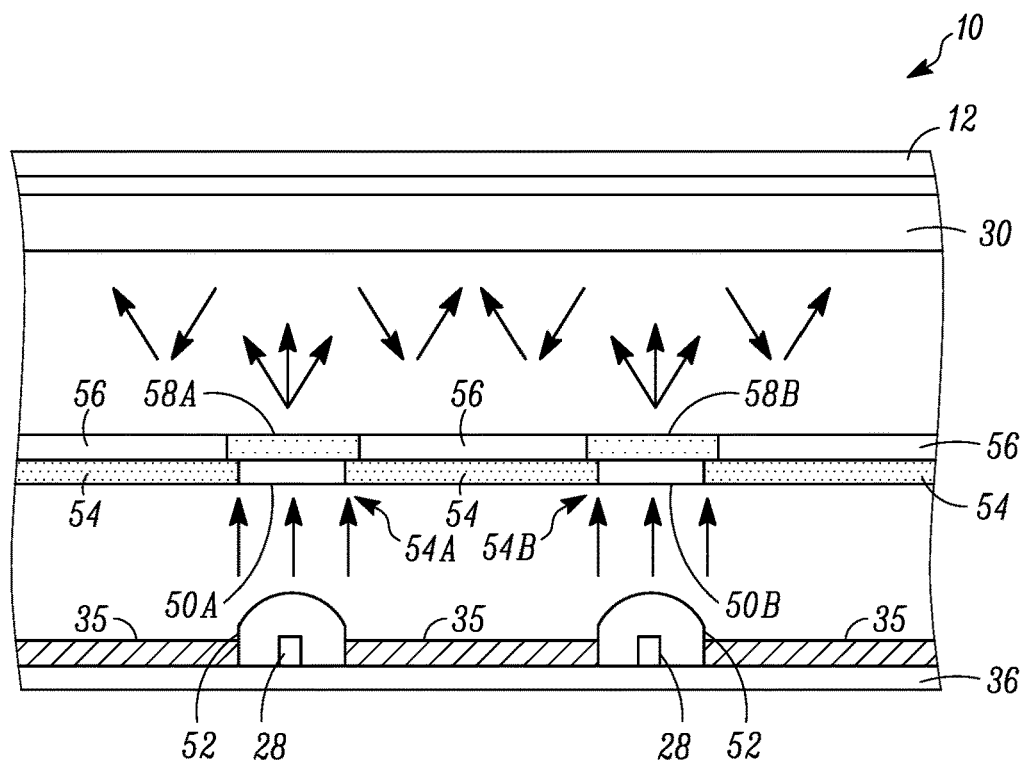
FIG. 5 is a schematic side sectional view of a portion of an LCD device, according to an embodiment.

FIG. 5 is a schematic side sectional view of a portion of an LCD device 10, according to an embodiment. Unless indicated specifically, the various hatching in the figure is intended to enhance the readability of the figure and is not intended to limit the features to specific materials. Aspects shown and described in accordance with FIG. 1 are removed for simplicity of the figure and the corresponding description. The illustrated embodiment shows two LEDs 28. It is to be appreciated that this is an example, and that the LCD device 10 will have more than two LEDs. Other aspects of FIG. 5 can be the same as or similar to aspects of FIGS. 2-4.

FIG. 5 includes second diffusers 58A, 58B. The second diffusers 58A, 58B are disposed between the bandpass filters 50A, 50B and the diffuser 30. The second diffusers 58A, 58B can be sized to correspond to a size of the bandpass filters 50A, 50B. That is, the second diffusers 58A, 58B may correspond in size to the holes 54A, 54B in the bandpass filter holder 54. The second diffusers 58A, 58B and the reflective layer 56 are disposed on the bandpass filter holder 54, the bandpass filters 50A, 50B, and the reflective layer 56, and are formed in a flush manner. In an embodiment, this configuration can reduce a thickness of the LCD device 10 relative to the embodiment in FIG. 4.

Figure 6A:
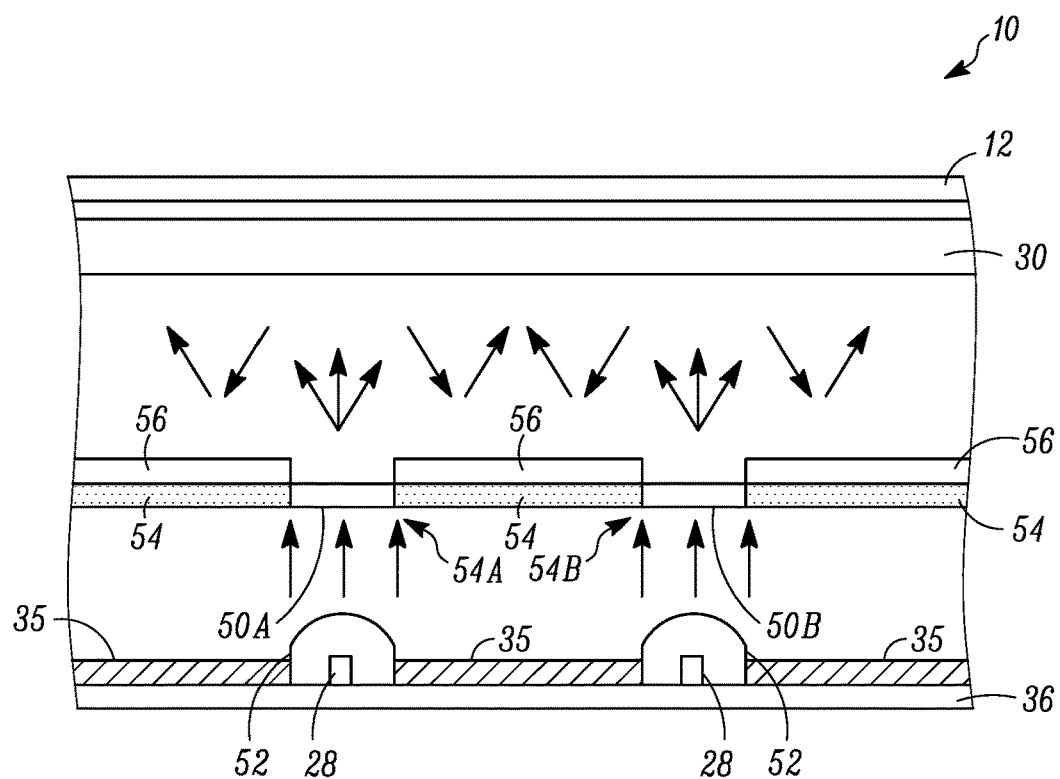
FIG. 6A is a schematic side sectional view of a portion of an LCD device, according to an embodiment.

FIG. 6A is a schematic side sectional view of a portion of an LCD device 10, according to an embodiment. Unless indicated specifically, the various hatching in the figure is intended to enhance the readability of the figure and is not intended to limit the features to specific materials. Aspects shown and described in accordance with FIG. 1 are removed for simplicity of the figure and the corresponding description. The illustrated embodiment shows two LEDs 28. It is to be appreciated that this is an example, and that the LCD device 10 will have more than two LEDs. Other aspects of FIG. 6A can be the same as or similar to aspects of FIGS. 2-5.

FIG. 6A includes the bandpass filter 50A, 50B. In the illustrated embodiment, the bandpass filters 50A, 50B include a surface modified portion or layer (layer 64 in FIG. 6B below). In an embodiment, the surface modified portion may be an embossed portion. The surface modified portion can provide additional diffusion of the light emitted such that an intensity of the light is more even. That is, in an embodiment, the surface modified portion or layer can function as the second diffusers 58A, 58B (FIG. 5).

Figure 6B:
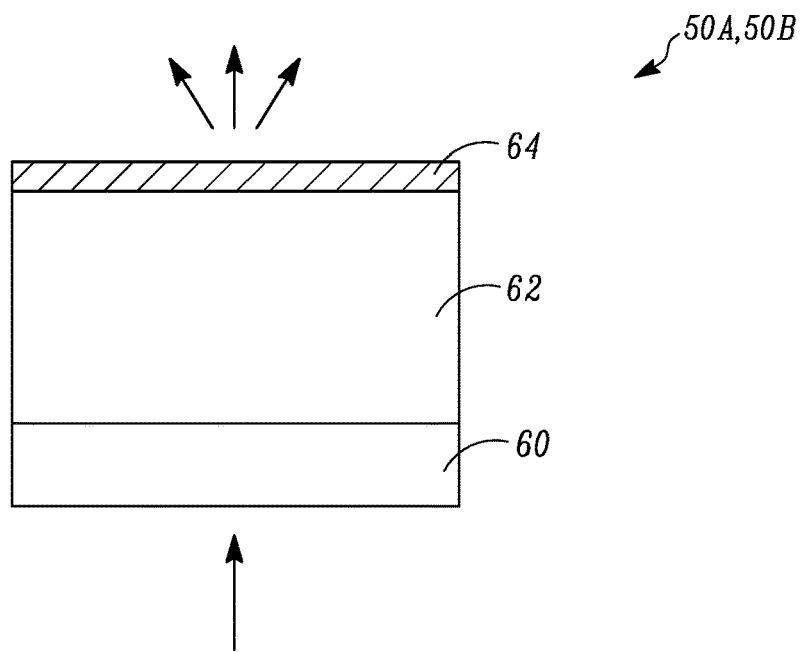
FIG. 6B is a schematic side sectional view of the bandpass filter in the LCD device of FIG. 6A.

FIG. 6B is a schematic side sectional view of the bandpass filter 50A, 50B of FIG. 6A. Unless indicated specifically, the various hatching in the figure is intended to enhance the readability of the figure and is not intended to limit the features to specific materials. The bandpass filter 50A, 50B includes a dielectric layer 60, a glass substrate layer 62, and an embossed pattern layer 64 on the surface of the glass substrate layer 62. It will be appreciated that the dielectric layer 60 can include a plurality of sublayers. The embossed pattern layer 64 can function as the second diffusers 58A, 58B (FIG. 5). It will be appreciated that the bandpass filter 50A, 50B of FIGS. 2-5 and 7 includes the dielectric layer 60 and the glass substrate layer 62.

Figure 7:
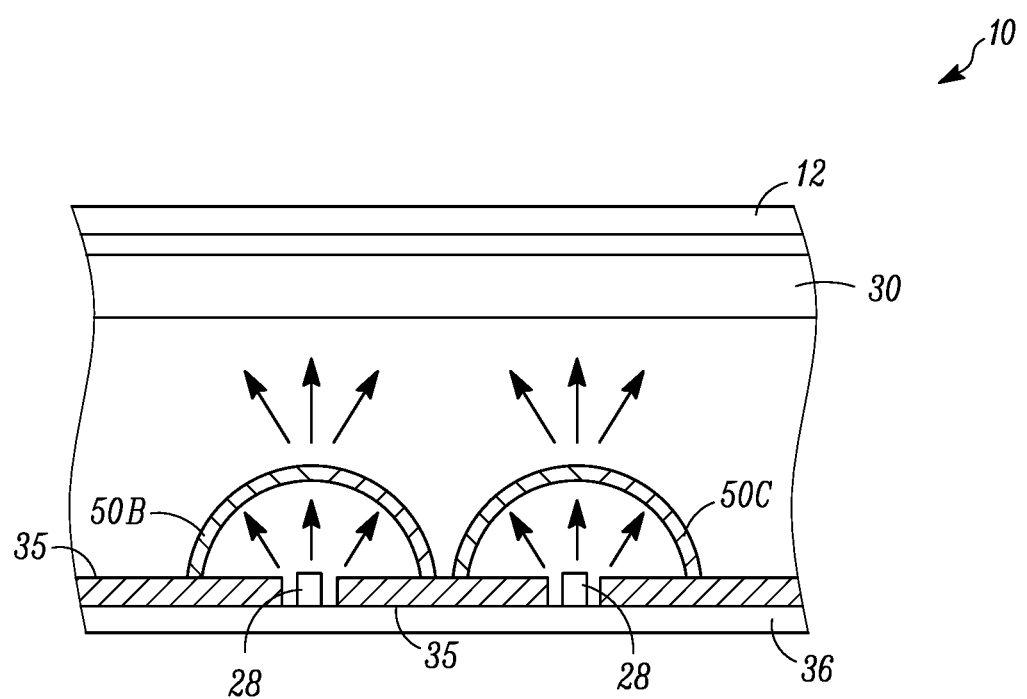
FIG. 7 is a schematic side sectional view of a portion of an LCD device, according to an embodiment.

FIG. 7 is a schematic side sectional view of a portion of an LCD device 10, according to an embodiment. Unless indicated specifically, the various hatching in the figure is intended to enhance the readability of the figure and is not intended to limit the features to specific materials. Aspects shown and described in accordance with FIG. 1 are removed for simplicity of the figure and the corresponding description. The illustrated embodiment shows two LEDs 28. It is to be appreciated that this is an example, and that the LCD device 10 will have more than two LEDs. Other aspects of FIG. 7 can be the same as or similar to aspects of FIGS. 2-6B.

FIG. 7 includes bandpass filters 50A-50B. In the illustrated embodiment, the LEDs 28 do not include focus lenses 52 (e.g., FIGS. 2-6B). The bandpass filters 50A-50B are secured to the LED substrate 36. In an embodiment, the bandpass filters 50A-50B are formed in a substantially semispherical shape. The semispherical shape can be selected so that light emitted from the LEDs 28 generally passes through the bandpass filters 50A-50B at an angle that is at or about 90°. In an embodiment, the light absorbing sheet 35 is disposed on the LED substrate 36. In an embodiment, using the bandpass filters 50A-50B in the illustrated manner can reduce a thickness of the LCD device 10 relative to the embodiments shown and described in accordance with FIGS. 2-6B.

Aspects:

It is noted that any one of aspects 1-9 below can be combined with any of aspects 10, 11-15, and 16-18. Aspect 10 can be combined with any one of aspects 11-15 and 16-18. Any one of aspects 11-15 can be combined with any one of aspects 16-18.

Aspect 1. A liquid crystal display device, comprising:
a liquid crystal display panel;
a light emitting diode (LED) substrate;
a plurality of light emitting diodes (LEDs) disposed on the LED substrate;
a first diffuser disposed between the plurality of LEDs and the liquid crystal display panel;
a bandpass filter disposed between the plurality of LEDs and the diffuser; and
a plurality of focus lenses corresponding to the plurality of LEDs and disposed between the plurality of LEDs and the bandpass filter, wherein each of the LEDs includes one of the plurality of focus lenses.

Aspect 2. The liquid crystal display device according to aspect 1, wherein the bandpass filter is a continuous planar sheet having a size that corresponds to a size of the LED substrate.

Aspect 3. The liquid crystal display device according to any one of aspects 1-2, further comprising a holder and a reflective sheet, the holder being disposed between the plurality of LEDs and the diffuser, the reflective sheet being disposed between the holder and the first diffuser, wherein the holder includes a plurality of holes aligned with the plurality of LEDs, the bandpass filter being disposed in the plurality of holes.

Aspect 4. The liquid crystal display device according to any one of aspects 1-3, further comprising a holder, a second diffuser, and a reflective sheet, the holder being disposed between the plurality of LEDs and the first diffuser, the second diffuser being disposed between the holder and the first diffuser, and the reflective sheet being disposed between the second diffuser and the first diffuser, wherein the holder includes a plurality of holes aligned with the plurality of LEDs, and the bandpass filter includes a plurality of bandpass filter portions, each of the plurality of bandpass filter portions being disposed in each of the plurality of holes.

Aspect 5. The liquid crystal display device according to any one of aspects 1-4, further comprising a holder, a plurality of diffuser portions, and a reflective sheet, the holder being disposed between the plurality of LEDs and the first diffuser, the plurality of diffuser portions being disposed between the holder and the first diffuser, the reflective sheet being disposed between the holder and the first diffuser, and the bandpass filter including a plurality of bandpass filter portions wherein the holder includes a plurality of holes aligned with the plurality of LEDs, each of the plurality of bandpass filter portions is disposed in each of the plurality of holes, and each of the plurality of diffuser portions is disposed on each of the plurality of the bandpass filter portions.

Aspect 6. The liquid crystal display device according to any one of aspects 1-5, further comprising a holder, and a reflective sheet, the holder being disposed between the plurality of LEDs and the first diffuser, the reflective sheet being disposed between the holder and the first diffuser, the bandpass filter includes a plurality of bandpass filter portions wherein the holder includes a plurality of holes aligned with the plurality of LEDs, each of the plurality of bandpass filter portions is disposed within each of the plurality of holes, and each of the plurality of bandpass filter portions includes a modified surface portion on a side disposed relatively nearer to the first diffuser.

Aspect 7. The liquid crystal display device according to any one of aspects 1-6, wherein the modified surface portion includes an embossed pattern.

Aspect 8. The liquid crystal display device according to any one of aspects 1-7, wherein the LED substrate is reflective.

Aspect 9. The liquid crystal display device according to any one of aspects 1-8, wherein the LED substrate is light absorbent.

Aspect 10. A liquid crystal display device, comprising:
a liquid crystal display panel;
a light emitting diode (LED) substrate;
a plurality of light emitting diodes (LEDs) disposed on the LED substrate;
a diffuser disposed between the plurality of LEDs and the liquid crystal display panel; and
a bandpass filter being disposed between the plurality of LEDs and the diffuser, wherein the bandpass filter includes a plurality of semispherical bandpass filter portions, each of the plurality of bandpass filter portions being disposed on the LCD substrate and surrounding one of the plurality of LEDs.

Aspect 11. A liquid crystal display device, comprising:
a liquid crystal display panel including a thin film transistor (TFT) substrate and a color filter substrate, with a liquid crystal layer disposed therebetween;
a backlight including a light emitting diode (LED) substrate having a plurality of light emitting diodes (LEDs) disposed thereon;
a plurality of focus lenses corresponding to the plurality of LEDs, each of the plurality of LEDs disposed in corresponding one of the plurality of focus lenses; and
a bandpass filter that sharpens a spectrum of light emitted from one of the plurality of the LEDs through one of the plurality of focus lenses, the bandpass filter being disposed between the plurality of LEDs and the liquid crystal display panel.

Aspect 12. The liquid crystal display device according to aspect 11, wherein the bandpass filter is a continuous sheet that overlaps the plurality of LEDs.

Aspect 13. The liquid crystal display device according to any one of aspects 11-12, further comprising a holder having a plurality of holes, the plurality of holes being aligned with the plurality of LEDs, wherein the bandpass filter includes a plurality of bandpass filter portions, the plurality of bandpass filter portions overlapping with the plurality of LEDs and being disposed in the plurality of holes.

Aspect 14. The liquid crystal display device according to any one of aspects 11-13, wherein the bandpass filter includes a plurality of bandpass filter portions having a semispherical shape, each of the plurality of bandpass filter portions surrounding one of the plurality of LEDs.

Aspect 15. The liquid crystal display device according to any one of aspects 11-14, wherein the bandpass filter includes a modified surface portion on a surface facing toward the liquid crystal display panel, the modified surface portion configured to diffuse light passing therethrough.

Aspect 16. A method, comprising:
emitting light from a backlight of a liquid crystal display device, the light being emitted from a plurality of light emitting diodes (LEDs);
passing the light through a bandpass filter; and
passing the light through a liquid crystal display panel.

Aspect 17. The method according to aspect 16, further comprising passing the light through a diffuser prior to passing the light through the liquid crystal display panel.

Aspect 18. The method according to any one of aspects 16-17, wherein emitting the light from the backlight of the liquid crystal display device includes directing the light from the plurality of LEDs through a plurality of focus lenses associated with each of the plurality of LEDs, the plurality of focus lenses controlling a direction of light directed toward the bandpass filter.

Aspect 19. The method according to aspect 18, wherein the plurality of focus lenses control the direction of light toward the bandpass filter such that the light is passed through the bandpass filter at an angle that is about 90° relative to a surface of the bandpass filter.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A liquid crystal display device, comprising:
   a liquid crystal display panel;
   a light emitting diode (LED) substrate;
   a plurality of light emitting diodes (LEDs) disposed on the LED substrate;
   a first diffuser disposed between the plurality of LEDs and the liquid crystal display panel;
   a bandpass filter disposed between the plurality of LEDs and the first diffuser;
   a plurality of focus lenses corresponding to the plurality of LEDs and disposed between the plurality of LEDs and the bandpass filter;
   a holder disposed between the plurality of LEDs and the first diffuser; and
   a reflective sheet disposed between the holder and the first diffuser,
   wherein each of the LEDs includes one of the plurality of focus lenses,
   the holder includes a plurality of holes aligned with the plurality of LEDs, and
   the bandpass filter is disposed in the plurality of holes.

2. The liquid crystal display device according to claim 1, further comprising a second diffuser disposed between the holder and the first diffuser, and the reflective sheet being disposed between the second diffuser and the first diffuser, wherein the bandpass filter includes a plurality of bandpass filter portions, each of the plurality of bandpass filter portions being disposed in each of the plurality of holes.

3. The liquid crystal display device according to claim 1, further comprising a plurality of diffuser portions disposed between the holder and the first diffuser, and the bandpass filter including a plurality of bandpass filter portions wherein each of the plurality of bandpass filter portions is disposed in each of the plurality of holes, and each of the plurality of diffuser portions is disposed on each of the plurality of the bandpass filter portions.

4. The liquid crystal display device according to claim 1, wherein the LED substrate is reflective.

5. The liquid crystal display device according to claim 1, wherein the LED substrate is light absorbent.

6. A liquid crystal display device, comprising:
   a liquid crystal display panel including a thin film transistor (TFT) substrate and a color filter substrate, with a liquid crystal layer disposed therebetween;
   a backlight including a light emitting diode (LED) substrate having a plurality of light emitting diodes (LEDs) disposed thereon;
   a plurality of focus lenses corresponding to the plurality of LEDs, each of the plurality of LEDs disposed in corresponding one of the plurality of focus lenses;
   a bandpass filter that sharpens a spectrum of light emitted from one of the plurality of the LEDs through one of the plurality of focus lenses, the bandpass filter being disposed between the plurality of LEDs and the liquid crystal display panel; and
   a holder having a plurality of holes, the plurality of holes being aligned with the plurality of LEDs,
   wherein the bandpass filter includes a plurality of bandpass filter portions, the plurality of bandpass filter portions overlapping with the plurality of LEDs and being disposed in the plurality of holes.

7. The liquid crystal display device according to claim 6, wherein the bandpass filter includes a modified surface portion on a surface facing toward the liquid crystal display panel, the modified surface portion configured to diffuse light passing therethrough.

8. A liquid crystal display device, comprising:
   a liquid crystal display panel;
   a light emitting diode (LED) substrate;
   a plurality of light emitting diodes (LEDs) disposed on the LED substrate;
   a first diffuser disposed between the plurality of LEDs and the liquid crystal display panel;
   a bandpass filter disposed between the plurality of LEDs and the first diffuser;
   a plurality of focus lenses corresponding to the plurality of LEDs and disposed between the plurality of LEDs and the bandpass filter;
   a holder disposed between the plurality of LEDs and the first diffuser; and
   a reflective sheet disposed between the holder and the first diffuser,
   wherein each of the LEDs includes one of the plurality of focus lenses,
   the bandpass filter includes a plurality of bandpass filter portions,
   the holder includes a plurality of holes aligned with the plurality of LEDs,
   each of the plurality of bandpass filter portions is disposed within each of the plurality of holes, and
   each of the plurality of bandpass filter portions includes a modified surface portion on a side disposed relatively nearer to the first diffuser.

9. The liquid crystal display device according to claim 8, wherein the modified surface portion includes an embossed pattern.

* * * * *